United States Patent
McCarty

(10) Patent No.: US 12,170,728 B2
(45) Date of Patent: Dec. 17, 2024

(54) PROVIDING COMMUNICATIONS THAT ARE SECURE FROM QUANTUM COMPUTER MODELS

(71) Applicant: Accenture Global Solutions Limited, Dublin (IE)

(72) Inventor: Benjamin Glen McCarty, Washington, DC (US)

(73) Assignee: Accenture Global Solutions Limited, Dublin (IE)

(*) Notice: Subject to any disclaimer, the term of this patent is extended or adjusted under 35 U.S.C. 154(b) by 224 days.

(21) Appl. No.: 17/815,050

(22) Filed: Jul. 26, 2022

(65) Prior Publication Data
US 2024/0039715 A1 Feb. 1, 2024

(51) Int. Cl.
*H04L 9/08* (2006.01)
*H04L 9/06* (2006.01)
*H04L 9/30* (2006.01)
*H04L 9/32* (2006.01)
*H04L 9/40* (2022.01)

(52) U.S. Cl.
CPC .......... *H04L 9/0866* (2013.01); *H04L 9/0643* (2013.01); *H04L 9/0825* (2013.01)

(58) Field of Classification Search
CPC ... H04L 9/0866; H04L 9/0643; H04L 9/0825; H04L 9/302; H04L 9/3239; H04L 9/40; H04L 9/0861
See application file for complete search history.

(56) References Cited

U.S. PATENT DOCUMENTS

| | | | | |
|---|---|---|---|---|
| 7,065,210 | B1* | 6/2006 | Tsujii | H04L 9/0847 380/259 |
| 11,038,683 | B1* | 6/2021 | Cheung | H04L 63/0478 |
| 2004/0125949 | A1* | 7/2004 | Seifert | H04L 9/0861 380/30 |
| 2010/0111308 | A1* | 5/2010 | Forsberg | H04L 9/0844 380/278 |
| 2010/0208887 | A1* | 8/2010 | Joye | H04L 9/004 713/182 |

(Continued)

OTHER PUBLICATIONS

I. Parris, G. Bigwood and T. Henderson. "Privacy-enhanced social network routing in opportunistic networks," 8th IEEE International Conference on Pervasive Computing and Communications Workshops (PERCOM Workshops), Mannheim, Germany, 2010, pp. 624-629. (Year: 2010).*

(Continued)

*Primary Examiner* — Darren B Schwartz
(74) *Attorney, Agent, or Firm* — Polsinelli PC

(57) ABSTRACT

A first device may provide a request to establish a secure communication with a second device, and may hide public keys based on a commutative legacy compatible encryption process sharing a modulus and based on quasi-Carmichael numbers larger than the modulus with quadratic residuals. The first device may utilize variable extendable-output function hashing, based on the modulus, with bloom filtering to generate an output that prevents creation of classical rainbow tables, and may utilize a key derivation function to generate a symmetric key based on the output. The first device may establish the secure communication with the second device based on the symmetric key.

20 Claims, 14 Drawing Sheets

(56) References Cited

U.S. PATENT DOCUMENTS

| | | | | |
|---|---|---|---|---|
| 2014/0355758 | A1* | 12/2014 | Feix | G06F 7/72 |
| | | | | 380/46 |
| 2016/0197729 | A1* | 7/2016 | Jones | H04L 9/3215 |
| | | | | 713/184 |
| 2019/0007428 | A1* | 1/2019 | Moen | H04L 67/02 |
| 2020/0137038 | A1* | 4/2020 | Endler | H04L 63/1425 |
| 2020/0250296 | A1* | 8/2020 | Zhao | G06F 21/45 |
| 2021/0135837 | A1* | 5/2021 | Cheung | H04L 9/008 |
| 2022/0166599 | A1* | 5/2022 | Fukuda | H04L 9/008 |
| 2024/0020414 | A1* | 1/2024 | Burns | G06F 21/602 |

OTHER PUBLICATIONS

Sharmir et al., "Mental Poker," The Mathematical Gardner, Massachusetts Institute of Technology, 1979, 8 Pages.

\* cited by examiner

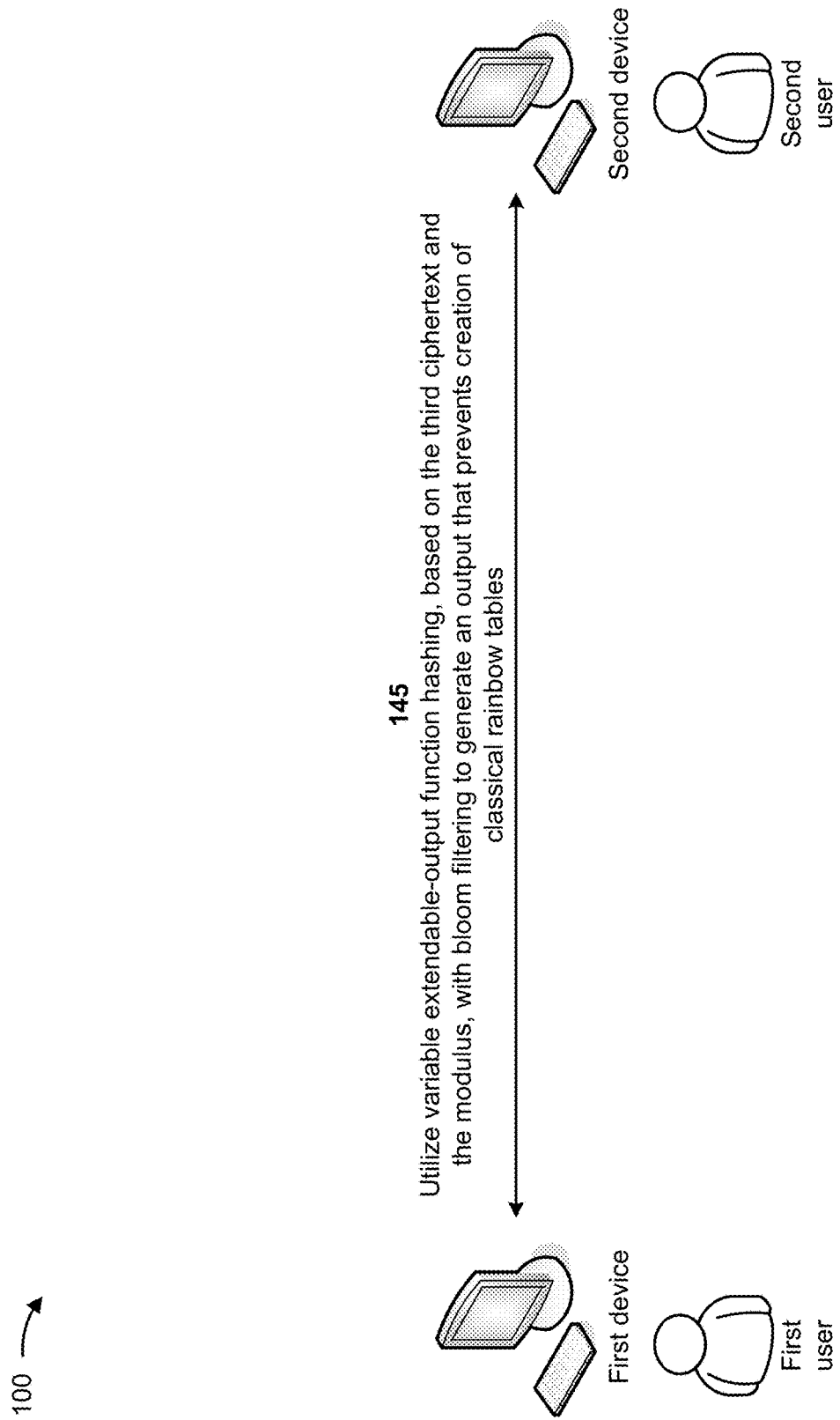

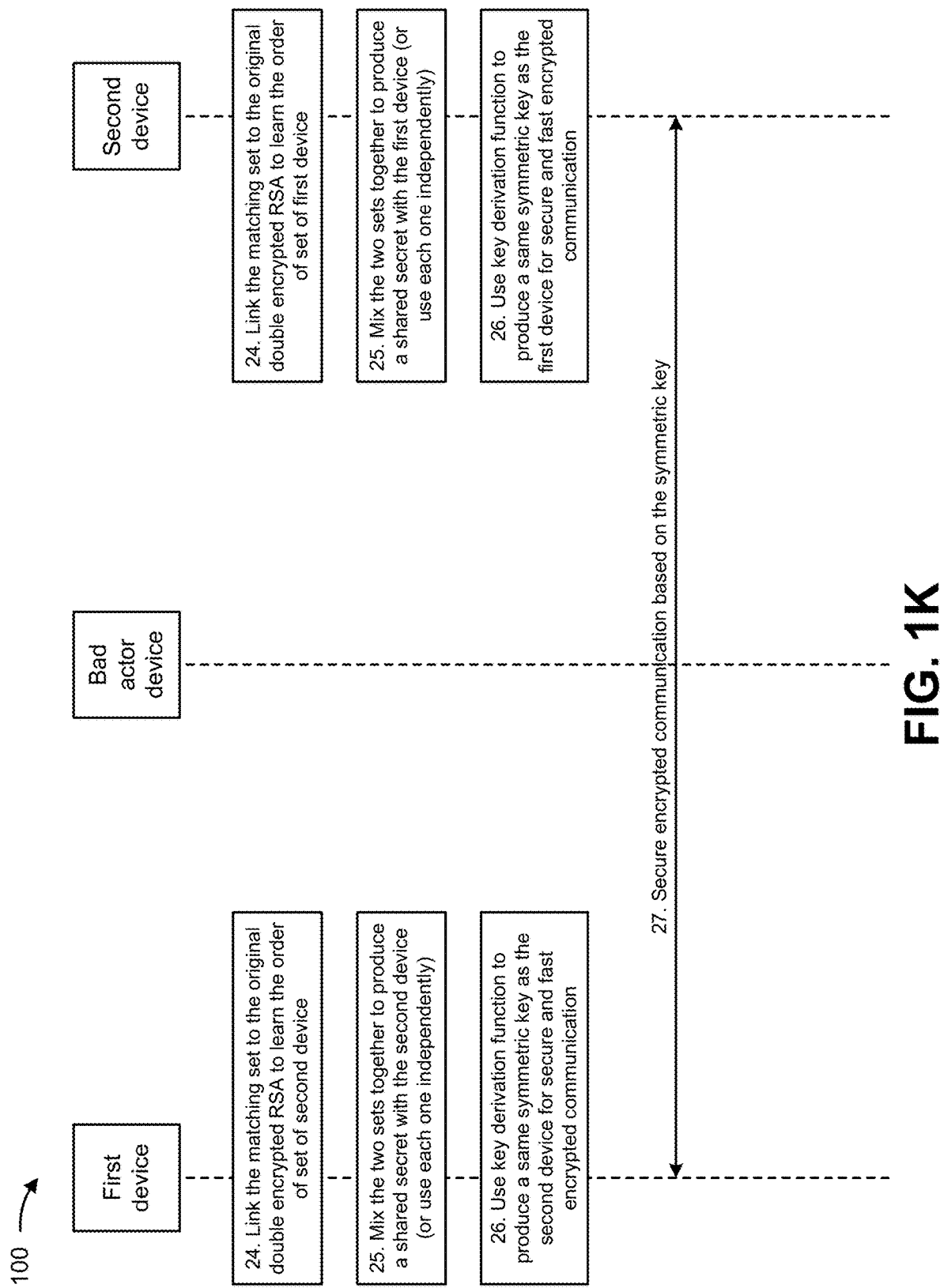

US 12,170,728 B2

PROVIDING COMMUNICATIONS THAT ARE SECURE FROM QUANTUM COMPUTER MODELS

BACKGROUND

In quantum computing, a quantum computer model executes on a realistic model of quantum computation and is a step-by-step procedure, where each of the steps are performed on a quantum computer.

SUMMARY

Some implementations described herein relate to a method. The method may include providing, by a first device, a request to establish a secure communication with a second device. The method may include hiding public keys based on a commutative legacy compatible encryption process sharing a modulus and based on quasi-Carmichael numbers larger than the modulus with quadratic residuals. The method may include utilizing variable extendable-output function hashing, based on the modulus, with bloom filtering to generate an output that prevents creation of classical rainbow tables, and utilizing a key derivation function to generate a symmetric key based on the output. The method may include establishing the secure communication with the second device based on the symmetric key.

Some implementations described herein relate to a first device. The first device may include one or more memories and one or more processors coupled to the one or more memories. The one or more processors may be configured to provide a request to establish a secure communication with a second device, and hide public keys based on a commutative legacy compatible encryption process sharing a modulus and based on quasi-Carmichael numbers larger than the modulus with quadratic residuals. The one or more processors may be configured to utilize variable extendable-output function hashing, based on the modulus, with bloom filtering to generate an output that prevents creation of classical rainbow tables. The variable extendable-output function may include a secure hash algorithm. The one or more processors may be configured to utilize a key derivation function to generate a symmetric key based on the output, and establish the secure communication with the second device based on the symmetric key.

Some implementations described herein relate to a non-transitory computer-readable medium that stores a set of instructions for a first device. The set of instructions, when executed by one or more processors of the first device, may cause the first device to provide a request to establish a secure communication with a second device, and hide public keys based on a commutative legacy compatible encryption process sharing a modulus and based on quasi-Carmichael numbers larger than the modulus with quadratic residuals. The set of instructions, when executed by one or more processors of the first device, may cause the first device to utilize variable extendable-output function hashing, based on the modulus, with bloom filtering to generate an output that prevents creation of classical rainbow tables, and utilize a key derivation function to generate a symmetric key based on the output. The symmetric key may include an advanced encryption standard 256 symmetric key. The set of instructions, when executed by one or more processors of the first device, may cause the first device to establish the secure communication with the second device based on the symmetric key.

BRIEF DESCRIPTION OF THE DRAWINGS

FIGS. 1A-1K are diagrams of an example implementation described herein.

DETAILED DESCRIPTION

Figure 1A:
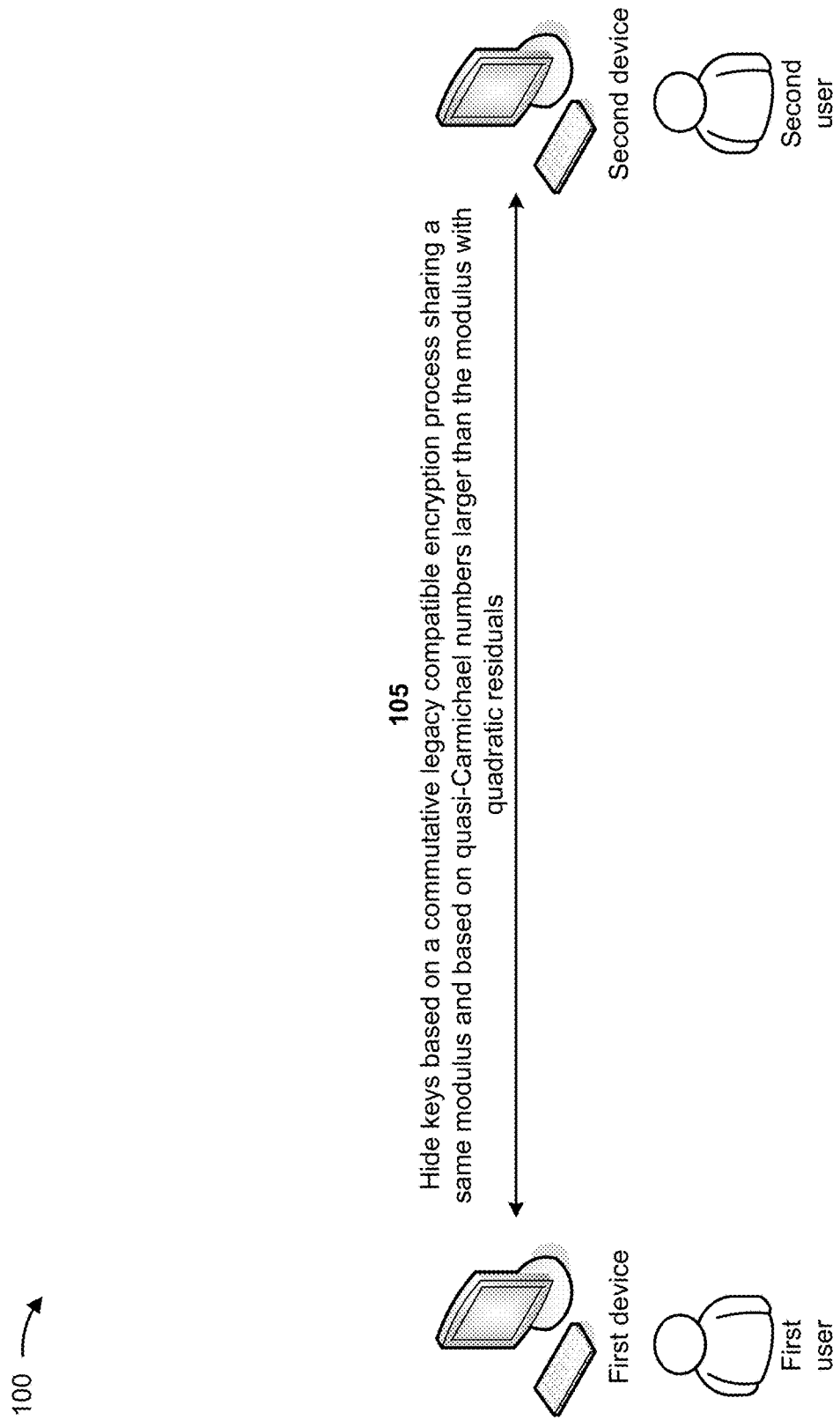

The following detailed description of example implementations refers to the accompanying drawings. The same reference numbers in different drawings may identify the same or similar elements.

Two quantum computer models may break existing cryptography utilized in secure communications. For example, Shor's model may quickly break prime factorization cryptography (e.g., Rivest-Shamir-Adleman (RSA) cryptography) and discrete log cryptography (e.g., Diffie-Hellman cryptography, elliptical curve cryptography, and/or the like). Grover's model may quickly identify answers in large databases, via key/hash rainbow table (e.g., a precomputed table for caching output of cryptographic hash functions, usually for cracking password hashes) lookups, for reversing cryptographic secrets. However, Shor's model needs access to a public key or a secret to break prime factorization cryptography, is unable to break prime factorization cryptography from observing only encrypted traffic, and is unable to factor a symmetric key. Grover's model requires a classic database to search and is unable to identify answers that have not been previously computed in rainbow tables. Post quantum cryptography (PQC) is designed to address the quantum computer model threat. However, PQC may be incompatible with legacy technology, may be broken with new quantum computer models, may require large quantities of data (e.g., megabytes of data), and/or the like.

Therefore, current techniques for securing communications against quantum computer models waste computing resources (e.g., processing resources, memory resources, communication resources, and/or the like), networking resources, and/or the like associated with encrypting communications that still may be broken with quantum computer models, experiencing theft of confidential information provided via encrypted communications that are broken with quantum computer models, identifying the theft of the confidential information provided via the encrypted communications, and/or the like.

Some implementations described herein relate to a device that provides communications that are secure from quantum computer models. For example, a first device may provide a request to establish a secure communication with a second device, and may hide public keys based on a commutative legacy compatible encryption process sharing a modulus and based on quasi-Carmichael numbers larger than the modulus with quadratic residuals. The first device may utilize variable extendable-output function hashing, based on the modulus, with bloom filtering to generate an output that prevents creation of classical rainbow tables, and may utilize a key derivation function to generate a symmetric key based on the output. The first device may establish the secure communication with the second device based on the symmetric key.

In this way, a device provides communications that are secure from quantum computer models. For example, a user of a first device may wish to establish a secure communication with a second device. The first device may hide encryption keys from Shor's model with a commutative legacy compatible encryption process that is faster and more legacy compatible despite a large quantity of encryptions. The first device may utilize variable extendable-output function hashing, with filtering, to prevent creation of classical rainbow tables (e.g., to be searched by Grover's model). The first device may utilize quasi-Carmichael numbers greater than a modulus with quadratic residuals to make decryption almost impossible. The second device may perform similar functions as the first device. The first device and the second device may utilize a key derivation function to generate a shared symmetric key for establishing the secure communication. This, in turn, conserves computing resources, networking resources, and/or the like that would otherwise have been consumed in encrypting communications that still may be broken with quantum computer models, experiencing theft of confidential information provided via encrypted communications that are broken with quantum computer models, identifying the theft of the confidential information provided via the encrypted communications, and/or the like.

FIGS. 1A-1K are diagrams of an example 100 associated with providing communications that are secure from quantum computer models. As shown in FIGS. 1A-1K, example 100 includes a first device associated with a first user and second device associated with a second user. Further details of the first device and the second device are provided elsewhere herein. The first user may wish to establish a secure communication with the second user via the first device and the second device. Alternatively, the second user may wish to establish a secure communication with the first user via the first device and the second device.

As shown in FIG. 1A, and by reference number 105, the first device and/or the second device may hide keys based on a commutative legacy compatible encryption process sharing a same modulus and based on quasi-Carmichael numbers larger than the modulus with quadratic residuals. For example, the first device and/or the second device may hide keys (e.g., encryption keys) from Shor's model with a commutative legacy compatible encryption process. The commutative legacy compatible encryption process may include an unpadded commutative Rivest-Shamir-Adleman (RSA) process that shares a same modulus with the first device and the second device. In some implementations, the first device and/or the second may not decrypt RSA encrypted information, which may increase a speed of the process and may make the process more legacy compatible despite a large quantity of encryptions. In some implementations, the first device and/or the second device may utilize quasi-Carmichael numbers larger than the modulus, with quadratic residuals, for the commutative legacy compatible encryption process and to make decryption impossible. Further details of the commutative legacy compatible encryption process are provided below in connection with FIGS. 1B-1E.

Figure 1B:
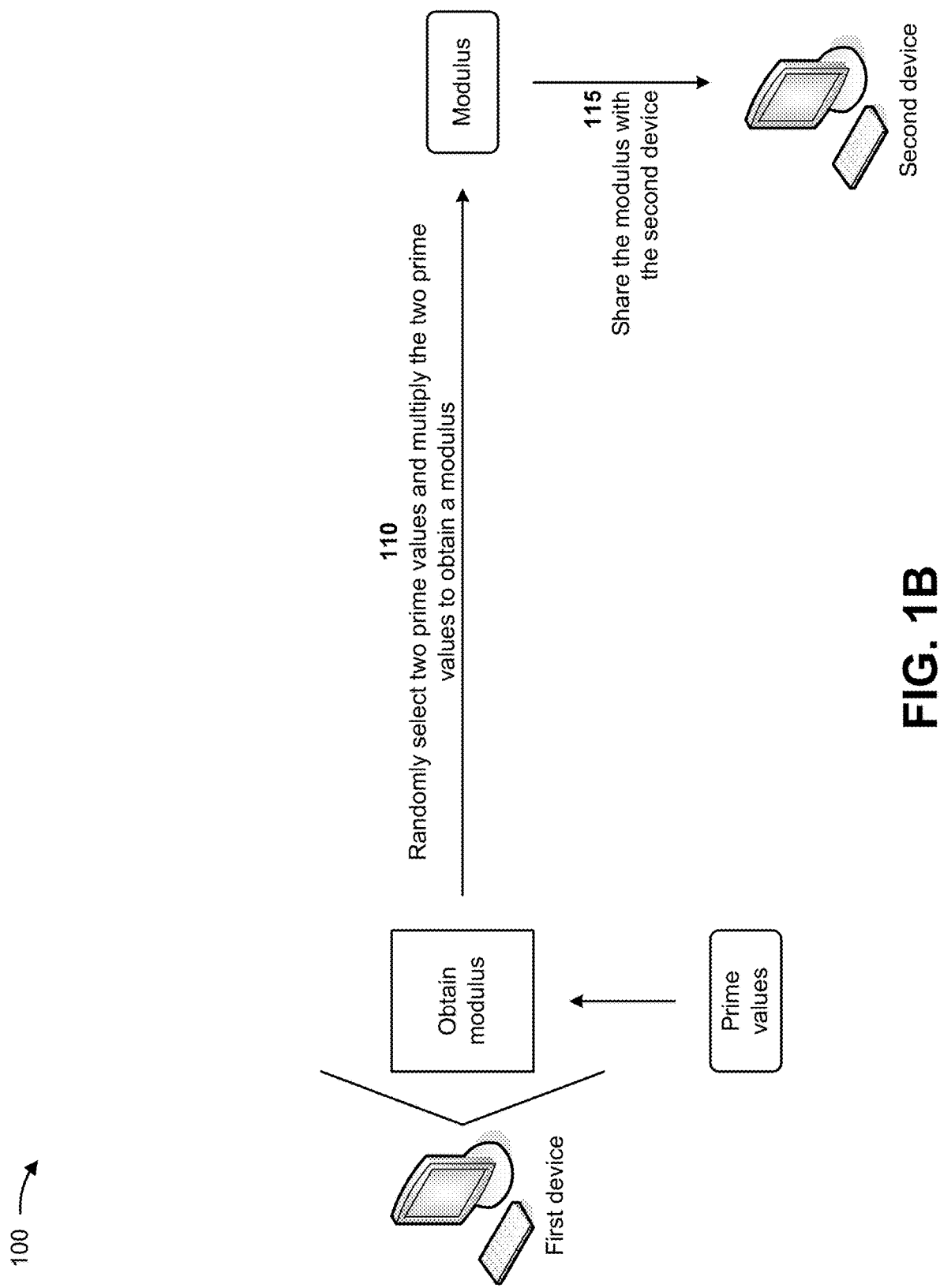

As shown in FIG. 1B, and by reference number 110, in order to hide the keys, the first device may randomly select two prime values and may multiply the two prime values to obtain a modulus. For example, the first device may randomly select two prime values (e.g., in some implementations, large prime values), such as P=7 and Q=11. The first device may multiply the two prime values (P and Q) to obtain a modulus (N=P×Q, 7×11=77). In some implementations, the first device may not exchange any keys with the second device.

As further shown in FIG. 1B, and by reference number 115, the first device may share the modulus with the second device. For example, the first device may provide the modulus (N) to the second device, and the second device may receive the modulus. The first device may share the modulus with the second device in order to forego exchanging keys with the second device (e.g., which may be comprised by a security threat).

Figure 1C:
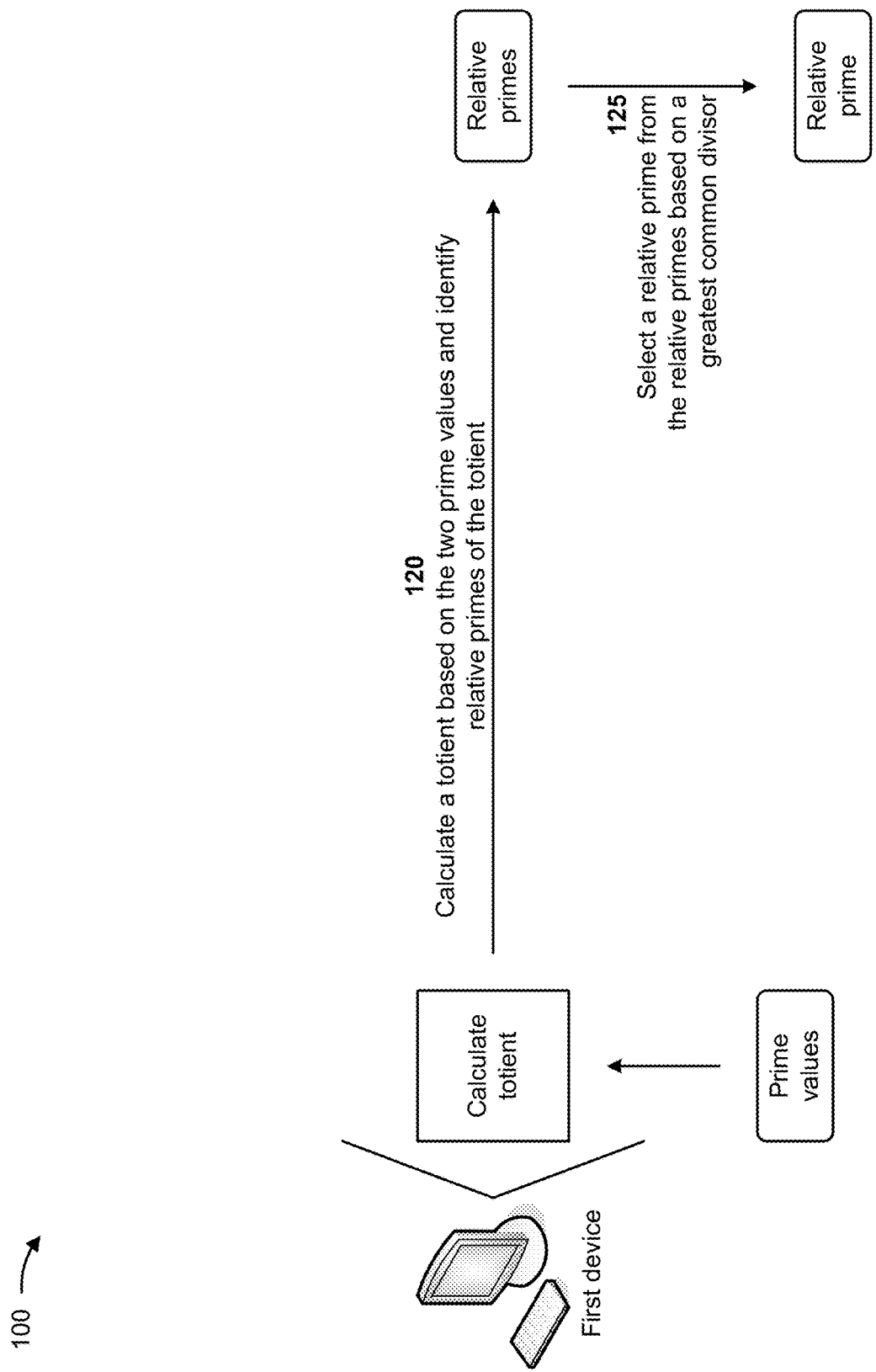

As shown in FIG. 1C, and by reference number 120, the first device may calculate a totient based on the two prime values and may identify relative primes of the totient. For example, a totient ($\varphi$) may count positive integers up to a given integer (n) that are relatively prime to the given integer (n). In some implementations, the first device may calculate the totient based on the two prime values as follows: ($\varphi$=(P−1)×(Q−1)=(7−1)×(11−1)=6×10=60. The first device may identify relative primes (e.g., co-primes) of the totient ($\varphi$), such as {1, 7, 11, 13, 17, 19, 23, 29, 31, 37, 41, 43, 47, 49, 53, 59}.

As further shown in FIG. 1C, and by reference number 125, the first device may select a relative prime from the relative primes based on a greatest common divisor. For example, the first device may select a relative prime (e) from the relative primes based on a greatest common divisor (gcd) according to the equation gcd(e, N)=1, where 1<e<N. In some implementations, when the modulus (N) is 77, the first device may select e=7 as the relative prime the greatest common divisor (e.g., gcd(7, 77)=1) when e=7. In some implementations, the second device may utilize a Carmichael lambda function to select a prime value (e) less than the modulus (N), such as e=53.

Figure 1D:
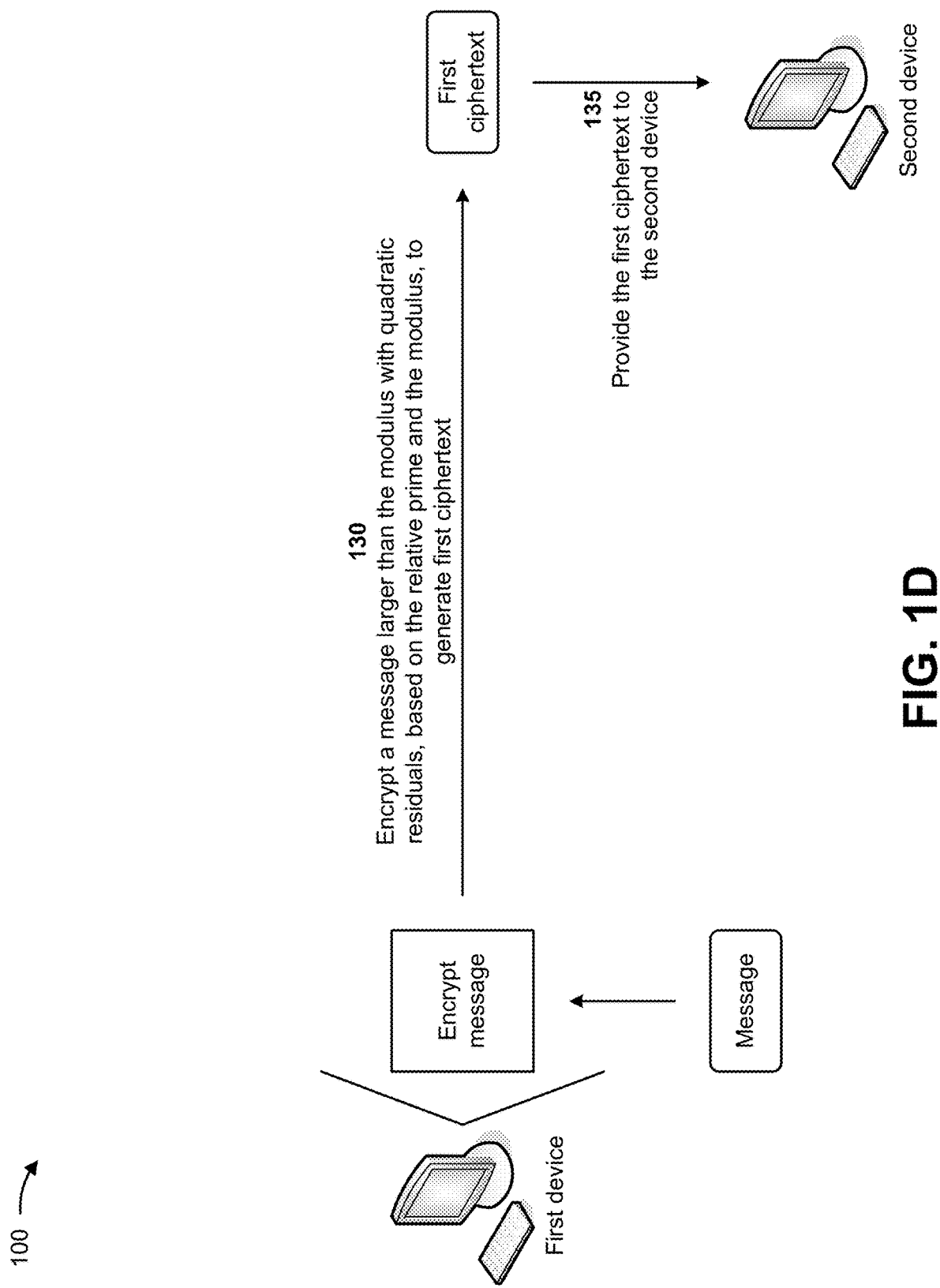

As shown in FIG. 1D, and by reference number 130, the first device may encrypt a message larger than the modulus with quadratic residuals, based on the relative prime and the modulus, to generate first ciphertext. For example, a message (M) may include a value (e.g., 38) that is larger than the modulus (N) with quadratic residuals. The first device may encrypt the message (M) based on the relative prime (e=7) and the modulus (N=77), to generate the first ciphertext (C) as follows: Similarly, the second device may encrypt the message (M) based on the relative prime (e=53) and the modulus (N=77), to generate second ciphertext (C) as follows: C=$M^e$ mod(N)=$38^{53}$ mod(77)=26.

In some implementations, the first device may utilize quasi-Carmichael numbers larger than the modulus with quadratic residuals to make decryption of the encrypted message likely impossible. For example, the first device may encrypt the message (e.g., M=38) with a public key to obtain the third ciphertext (e.g., C=3), as follows: C=$M^e$ mod(N)=$38^7$ mod(77)=3. The first device may decrypt the third ciphertext (e.g., C=3) with a private key to obtain the original message (e.g., M=38), as follows: M=$C^d$ mod(N)=$3^{43}$ mod(77)=38.

In some implementations, the first device may encrypt a message (e.g., M=561) larger than the modulus (N=77) and with special properties (e.g., a Carmichael number). For example, the first device may encrypt the message (e.g., M=561) with a public key to obtain the third ciphertext (e.g., C=22), as follows: C=$M^e$ mod(N)=$561^7$ mod(77)=22. The first device may decrypt the third ciphertext (e.g., C=22) with a private key to obtain the original message (e.g., M=561), as follows: M=$C^d$ mod(N)=$22^{43}$ mod(77)=561. Double encryption commutative properties may be utilized with quasi-Carmichael numbers larger than the modulus (N)

and are more difficult to reverse and/or factor than other random numbers greater than the modulus (N).

In another example, a larger quasi-Carmichael number may still provide double encryption commutative properties. In this example, the first device may encrypt the message (e.g., M=1105) with a public key to obtain the third ciphertext (e.g., C=69), as follows: $C=M^e \mod(N)=1105^7 \mod(77)=69$. The second device may encrypt the message (e.g., M=1105) with a public key to obtain the third ciphertext (e.g., C=48), as follows: $C=M^e \mod(N)=1105^{53} \mod(77)=48$. The first device may encrypt the third ciphertext (e.g., C=48) to obtain double-encrypted ciphertext (e.g., C=27), as follows: $C=M^e \mod(N)=48^7 \mod(77)=27$. The second device may encrypt the third ciphertext (e.g., C=69) to obtain the double-encrypted ciphertext (e.g., C=27), as follows: $C=M^e \mod(N)=69^{53} \mod(77)=27$.

In still another example, an even larger quasi-Carmichael number may still provide double encryption commutative properties. In this example, the first device may encrypt to obtain first ciphertext: $6553130926752006031481761^{13771927877214701} \mod (36567232109354321)=322607 56982606222$. The first device may attempt to decrypt the first ciphertext but may fail: $322607 56982606222^{15417970063428857} \mod (36567232109354321)=12080881633900184$. The second device may encrypt to obtain second ciphertext: $6553130926752006031481761^{20458974359533853} \mod (36567232109354321)=35749387273019796$. The second device may encrypt the first ciphertext: $322607 56982606222^{20458974359533853} \mod (36567232109354321)=36154595552119192$. The first device may encrypt the second ciphertext: $35749387273019796^{13771927877214701} \mod (36567232109354321)=36154595552119192$ (e.g., which is the same result as obtained by the second device).

As further shown in FIG. 1D, and by reference number 135, the first device may provide the first ciphertext to the second device. For example, the first device may provide the first ciphertext (e.g., C=3) to the second device, and the second device may provide the second ciphertext (e.g., C=26) to the first device.

Figure 1E:
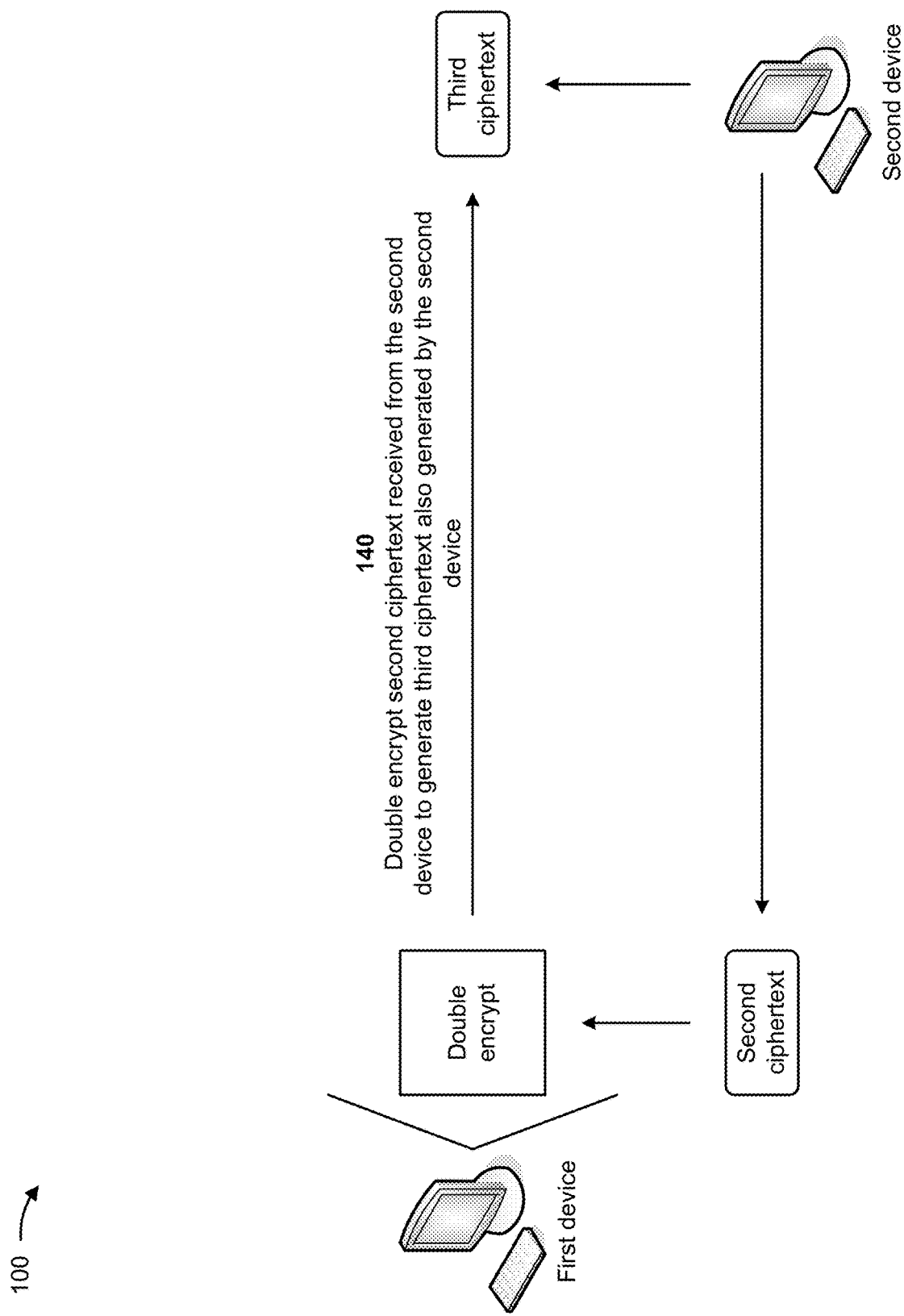

As shown in FIG. 1E, and by reference number 140, the first device may double encrypt the second ciphertext received from the second device to generate third ciphertext also generated by the second device. For example, the first device may double encrypt the second ciphertext (e.g., C=26) based on the relative prime (e=7) and the modulus (N=77), to generate the third ciphertext (C) as follows: $C=C^e \mod(N)=26^7 \mod(77)=5$. Similarly, the second device may double encrypt the first ciphertext (e.g., C=3) based on the relative prime (e=53) and the modulus (N=77), to generate the third ciphertext (C) as follows: $C=C^e \mod(N)=3^{53} \mod(77)=5$. After double encrypting, the first device and the second device may include the same ciphertext value (e.g., the third ciphertext (e.g., C=5)), which demonstrates the commutative encryption property of unpadded RSA encryption without ever decrypting or exchanging keys.

As shown in FIG. 1F, and by reference number 145, the first device and/or the second device may utilize variable extendable-output function hashing, based on the third ciphertext and the modulus, with bloom filtering to generate an output that prevents creation of classical rainbow tables. For example, if a security threat (e.g., a bad actor) was able to break the encryption and view the modulus (N), the first ciphertext (C=3), the second ciphertext (e.g., C=26), and the third ciphertext (e.g., C=5), the security threat may reverse engineer such information to determine the relative prime (e) and the message (M). To prevent such a threat, the first device may utilize the variable extendable-output function hashing, based on the third ciphertext and the modulus, with the bloom filtering to generate the output the prevents creation of classical rainbow tables. Without the classical rainbow tables, Grover's model will have nothing to search to determine the relative prime (e) and the message (M). In some implementations, the variable extendable-output function is a secure hash algorithm, such as the Shake-256 function.

For example, the first device and the second device may utilize the variable extendable-output function to hash (e.g., via a message-digest (MD) has generator) the third ciphertext (e.g., C=5) (e.g., to hide the third ciphertext from the security threat) before exchanging the third ciphertext to ensure that values of the third ciphertext match, as follows: MD5(5)=E4DA3B7FBBCE2345D7772B0674A318D5.

However, Grover's model may search through unsorted databases of hash rainbow tables to discover MD5(5). In some implementations, the first device and the second device may multiply the third ciphertext (C), a value (e.g., 8), and the modulus (N), and add another value (e.g., 512) to the product, to generate output bits for the Shake-256 function. In some implementations, the first device and the second device may agree to utilize multiple rounds, salts, enhanced double hashing, and other techniques to improve the security of the output bits. For example, based on the values provided above for the third ciphertext and the modulus, the first device and the second device may calculate 5×8×77+512=3592 output bits for the Shake-256 function. The Shake-256 function may process the third ciphertext and the output bits, to generate a hash, as follows: shake256(5, 3592)=172f84a65934fc 29776758a22ad080b341b497b1967d89a20dbd8420f4d450 7ba159ce4aff3aea877 44765c37a6f7a34a6c6c5127e 76df0aad2f52650420243a01edfce384bc77c5c7e97a4e0e4 a29ede2 ba7c434f95a892db7073d488a714a58802af5bdd 6049965a1cc3aa2507a1816ccf2eee63349fd5cfdf fc950e1358243dc179d7d50ea7886321854c76704b7c3770 d9a90d2ef276ba3ab31a66c5b5639f4d ad2ea9645541 ae2fd98e394addd2b600e86abea7c696c7f65732a77848b87 7887aed805f4c4bd4ba6 d0162ce3919795961a5ae28d4 ae335cea022bfbacd2ccb17d8d4c33d8682c2ebc123ea55317 414ca 7ace319fca872e7dc9b5470d76ddfa963f594e16add 57e3ea67f182247c8b66d786e7d8e2d6b36eb7 16f8dca 864f66431811f9561e5d85abf2426253e19671a5c5c4059d79 b1dle7e266045dbef1b7b5f9 19afa75dc1110fcef34d34c446 feeff6e5244abf0f0b234930a08097ddcb0e77fdd5e9a190945 67e62 ad60aad2d71c5eld88141e3c0812615c8f922602a95c 796a59132cb8cd21b475b4ca00f99e782ed1 5951d63c9 ab451f96464378c658b9fdac0df9a25899f13eb99e4bb4566 1df92ed5f165e4eadf3dfef6 10a06d2.

The first device and the second device may utilize bloom filtering to select a last ten bits of the Shake-256 hash, as follows: where 6D2=0110 1101 0010 and 98 7654 3210, the last ten bits may be 1011010010. The first device may provide the last ten bits (e.g., a hex value) to the second device, and the second device may provide the last ten bits to the first device. The first device and the second device may check the last ten bits against the Shake-256 hash and may experience a less than one percent chance of collision errors. However, the security threat is guaranteed to experience collision errors and will be unable to generate rainbow tables with extremely large and varying values.

Figure 1G:
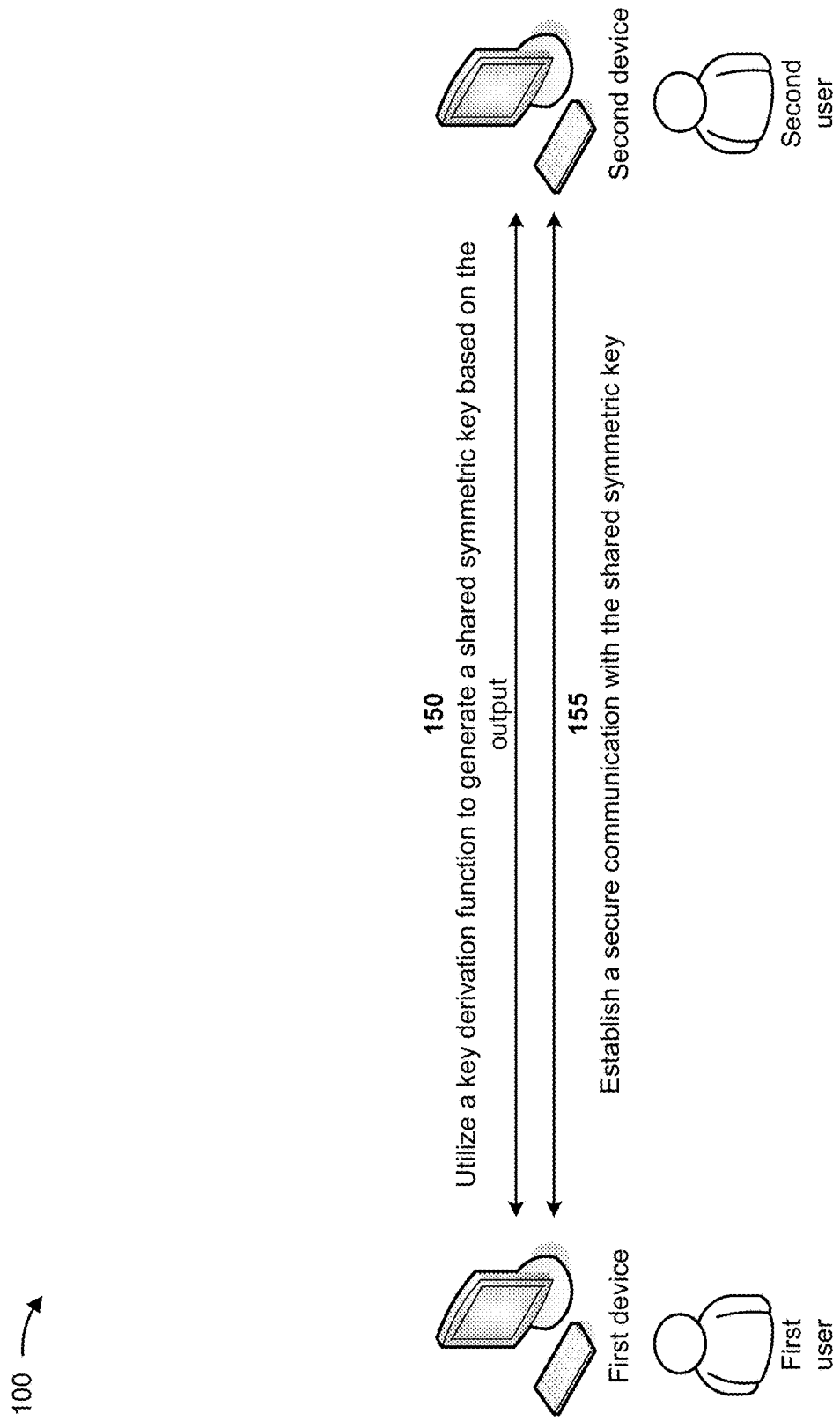

As shown in FIG. 1G, and by reference number 150, the first device and/or the second device may utilize a key derivation function to generate a shared symmetric key based on the output. For example, the first device may provide the output generated by the variable extendable-output function hashing to the second device, and the second device may receive the output. The second device may provide the output generated by the variable extendable-output function hashing to the first device, and the first device may receive the output. The first device and/or the second device may utilize the key derivation function to generate the shared symmetric key (e.g., an advanced encryption standard (AES) 256 symmetric key). The first device and the second device may possess the same symmetric key.

As further shown in FIG. 1G, and by reference number 155, the first device and/or the second device may establish a secure communication with the shared symmetric key. For example, the first device may utilize the shared symmetric key to generate the secure communication (e.g., an encrypted communication that is encrypted with the shared symmetric key). The first device may provide the secure communication to the second device, and the second device may utilize the shared symmetric key to decrypt the encrypted communication. Alternatively, or additionally, the second device may utilize the shared symmetric key to generate the secure communication. The second device may provide the secure communication to the first device, and the first device may utilize the shared symmetric key to decrypt the encrypted communication.

Figure 1H:
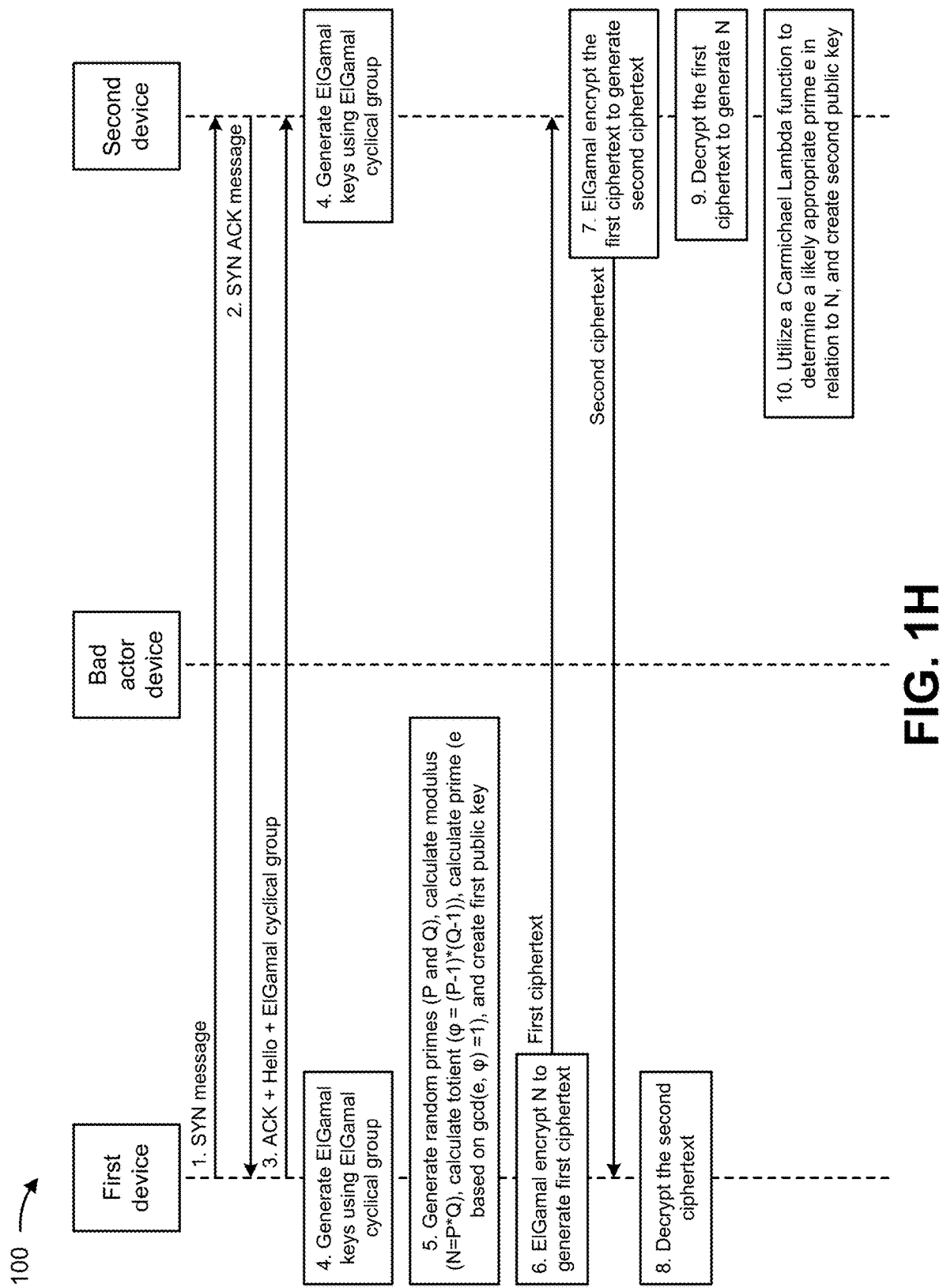

FIGS. 1H-1K depict an example of the first device and the second device establishing a secure communication that cannot be compromised by a bad actor associated with a bad actor device. As shown in FIG. 1H, and by step 1, the first device may provide a synchronize (SYN) message to the second device. The second device may receive the SYN message, and may generate a synchronize acknowledgement (SYN ACK) message. As shown by step 2, the second device may provide the SYN ACK message to the first device. The first device may receive the SYN ACK message and may generate an acknowledgement (ACK) message that includes a hello message and a ElGamal encryption cyclical group. As shown by step 3, the first device may provide the ACK message to the second device, and the second device may receive the ACK message.

As further shown in FIG. 1H, and by step 4, the first device and the second device may generate ElGamal encryption keys using the ElGamal encryption cyclical group. As shown by step 5, the first device may generate random primes (P and Q), may calculate a modulus based on the random primes (N=P×Q), may calculate a totient based on the random primes (φ=(P−1)×(Q−1)), may calculate a prime (e based on gcd(e, φ)=1), and may create a first public key. As shown by step 6, the first device may ElGamal encrypt the modulus (N) to generate first ciphertext, and may provide the first ciphertext to the second device. As shown by step 7, the second device may ElGamal encrypt the first ciphertext to generate second ciphertext, and may provide the second ciphertext to the first device. As shown by step 8, the first device may decrypt the second ciphertext. As shown by step 9, the second device may decrypt the first ciphertext to generate the modulus (N). As shown by step 10, the second device may utilize a Carmichael lambda function to determine a likely appropriate prime e in relation to the modulus N, and may create a second public key.

Figure 1I:
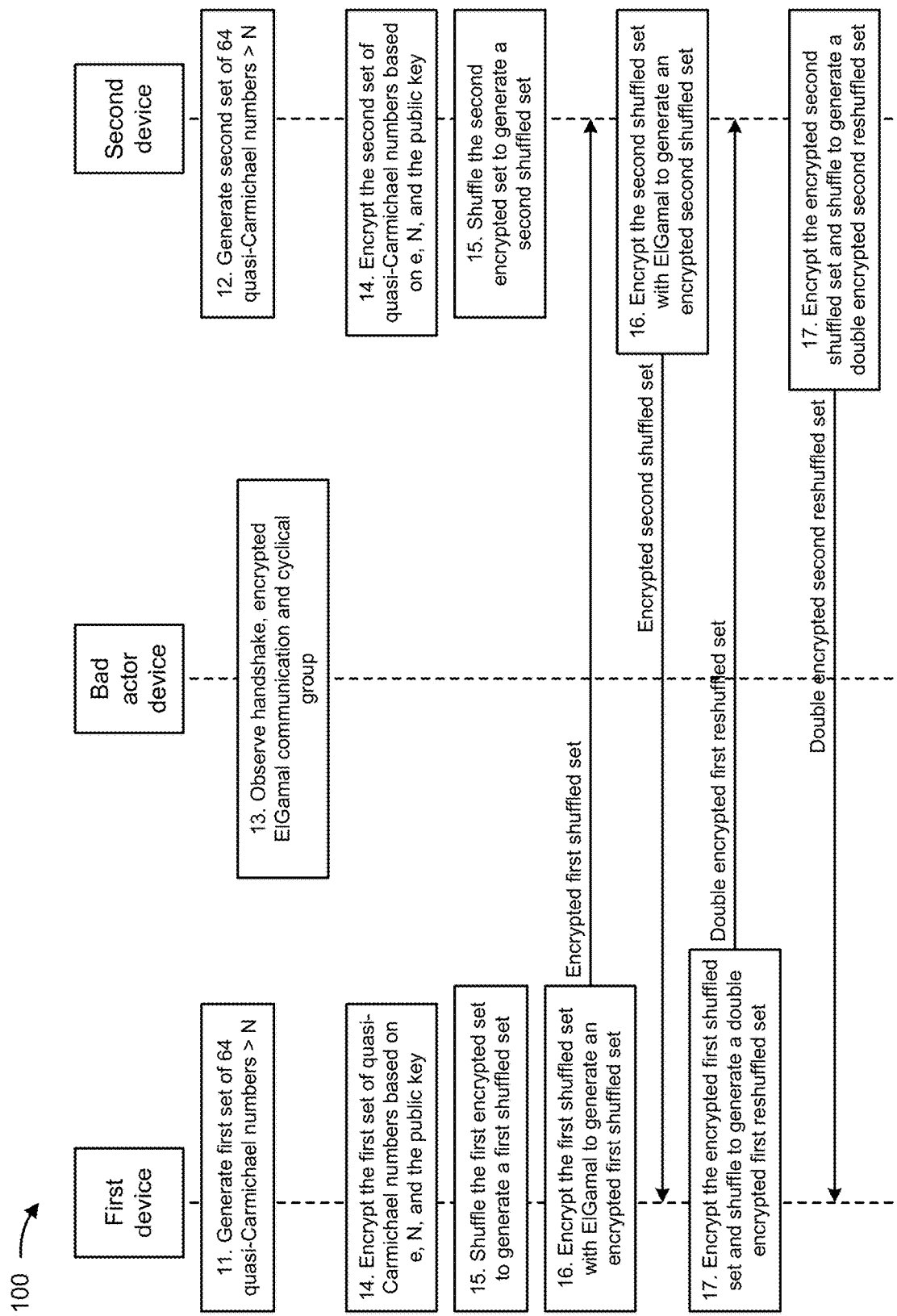

As shown in FIG. 1I, and by step 11, the first device may generate a first set of 64 quasi-Carmichael numbers that are greater than the modulus (N). As shown by step 12, the second device may generate a second set of 64 quasi-Carmichael numbers that are greater than the modulus (N).

As shown by step 13, the bad actor device may observe the handshake, the encrypted ElGamal communication, and the ElGamal cyclical group exchanged between the first device and the second device. As shown by step 14, the first device may encrypt the first set of quasi-Carmichael numbers based on the prime (e), the modulus (N), and the first public key, and the second device may encrypt the second set of quasi-Carmichael numbers based on the prime (e), the modulus (N), and the second public key. As shown by step 15, the first device may shuffle the first encrypted set to generate a first shuffled set, and the second device may shuffle the second encrypted set to generate a second shuffled set.

As further shown in FIG. 1I, and by step 16, the first device may encrypt the first shuffled set with ElGamal to generate an encrypted first shuffled set, and may provide the encrypted first shuffled set to the second device. As also shown by step 16, the second device may encrypt the second shuffled set with ElGamal to generate an encrypted second shuffled set, and may provide the encrypted second shuffled set to the first device. As shown by step 17, the first device may encrypt the encrypted first shuffled set and may shuffle to generate a double encrypted first reshuffled set, and may provide the double encrypted first reshuffled set to the second device. As also shown by step 17, the second device may encrypt the encrypted second shuffled set and may shuffle to generate a double encrypted second reshuffled set, and may provide the double encrypted second reshuffled set to the first device.

Figure 1J:
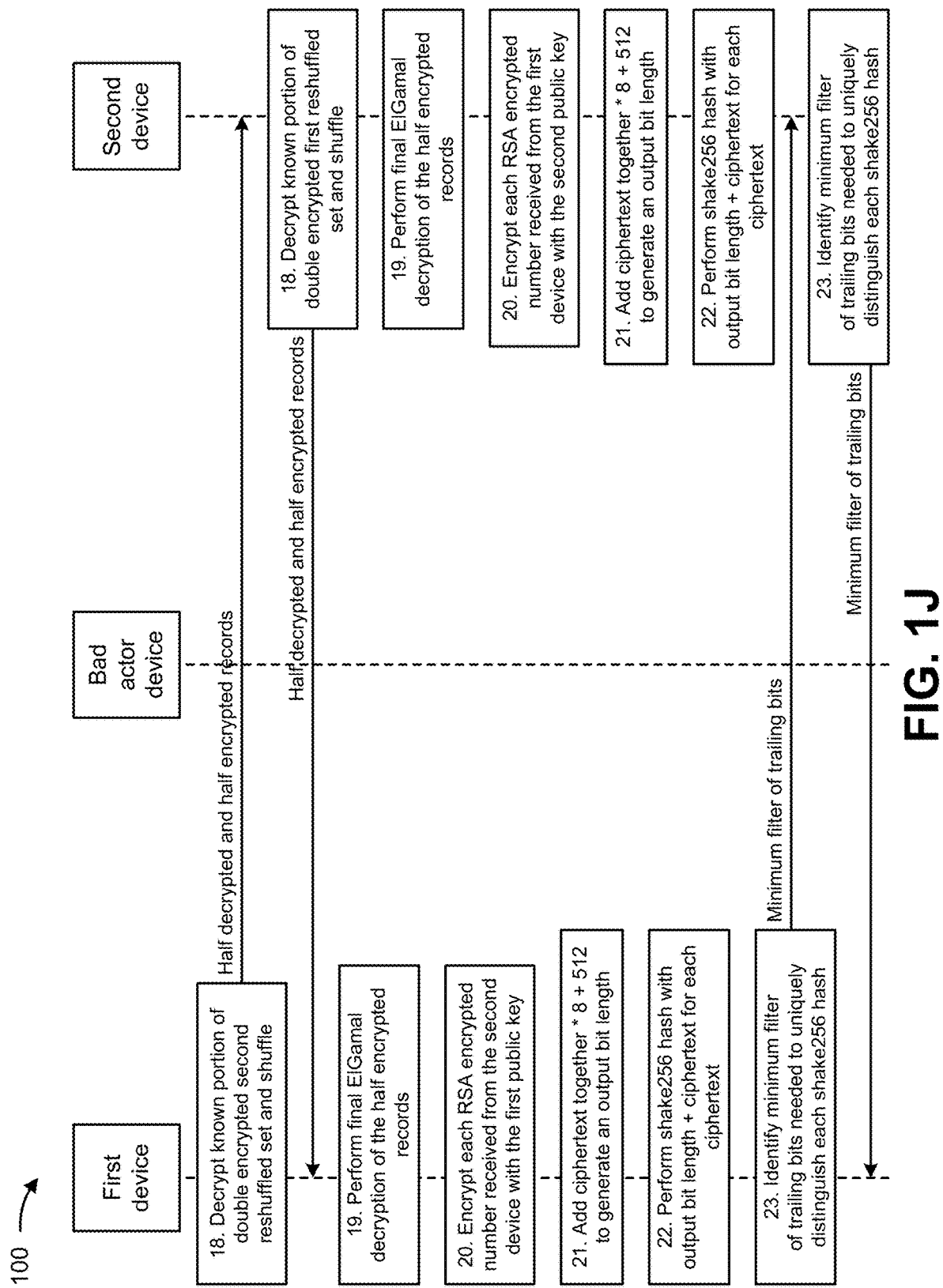

As shown in FIG. 1J, and by step 18, the first device may decrypt a known portion of double encrypted second reshuffled set and may shuffle, and may provide the half decrypted half encrypted records to the second device. As also shown by step 18, the second device may decrypt a known portion of double encrypted first reshuffled set and may shuffle, and may provide the half decrypted half encrypted records to the first device. As shown by step 19, the first device and the second device may perform a final ElGamal decryption of the half encrypted records. As shown by step 20, the first device may encrypt each RSA encrypted number received from the second device with the first public key. As also shown by step 20, the second device may encrypt each RSA encrypted number received from the first device with the second public key.

As further shown in FIG. 1J, and by step 21, the first device and the second device may add the ciphertext together and multiply the sum by 8 and add 512 to generate an output bit length. As shown by step 22, the first device and the second device may perform a Shake-256 hash with the output bit length and the ciphertext for each ciphertext. As shown by step 23, the first device may identify a minimum filter of trailing bits needed to uniquely distinguish each Shake-256 hash, and may provide the minimum filter of trailing bits to the second device. As also shown by step 23, the second device may identify a minimum filter of trailing bits needed to uniquely distinguish each Shake-256 hash, and may provide the minimum filter of trailing bits to the first device.

As shown in FIG. 1K, and by step 24, the first device may link a matching set to the original double encrypted RSA to learn the order of the set of the second device. As also shown by step 24, the second device may link a matching set to the original double encrypted RSA to learn the order of the set of the first device. As shown by step 25, the first device may mix the two sets together to produce a shared secret with the second device or the first device may utilize each set independently. As also shown by step 25, the second device may mix the two sets together to produce a shared secret with the first device or the second device may utilize each set independently. As shown by step 26, the first device may use a key derivation function to produce a same symmetric key as the second device for secure and fast encrypted communication. As also shown by step 26, the second device may use the key derivation function to produce the same symmetric key as the first device for secure and fast encrypted communication. As shown by step 27, the first device and the second device may conduct a secure encrypted communication based on the symmetric key, without the bad actor device being able to decipher keys, the communication, and/or other secure information.

In this way, a device provides communications that are secure from quantum computer models. For example, a user of a first device may wish to establish a secure communication with a second device. The first device may hide encryption keys from Shor's model with a commutative legacy compatible encryption process is faster and more legacy compatible despite a large quantity of encryptions. The first device may utilize variable extendable-output function hashing, with filtering, to prevent creation of classical rainbow tables (e.g., to be searched by Grover's model). The first device may utilize quasi-Carmichael numbers greater than a modulus with quadratic residuals to make decryption almost impossible. The second device may perform similar functions as the first device. The first device and the second device may utilize a key derivation function to generate a shared symmetric key for establishing the secure communication. This, in turn, conserves computing resources, networking resources, and/or the like that would otherwise have been consumed in encrypting communications that still may be broken with quantum computer models, experiencing theft of confidential information provided via encrypted communications that are broken with quantum computer models, identifying the theft of the confidential information provided via the encrypted communications, and/or the like.

As indicated above, FIGS. 1A-1K are provided as an example. Other examples may differ from what is described with regard to FIGS. 1A-1K. The number and arrangement of devices shown in FIGS. 1A-1K are provided as an example. In practice, there may be additional devices, fewer devices, different devices, or differently arranged devices than those shown in FIGS. 1A-1K. Furthermore, two or more devices shown in FIGS. 1A-1K may be implemented within a single device, or a single device shown in FIGS. 1A-1K may be implemented as multiple, distributed devices. Additionally, or alternatively, a set of devices (e.g., one or more devices) shown in FIGS. 1A-1K may perform one or more functions described as being performed by another set of devices shown in FIGS. 1A-1K.

Figure 2:
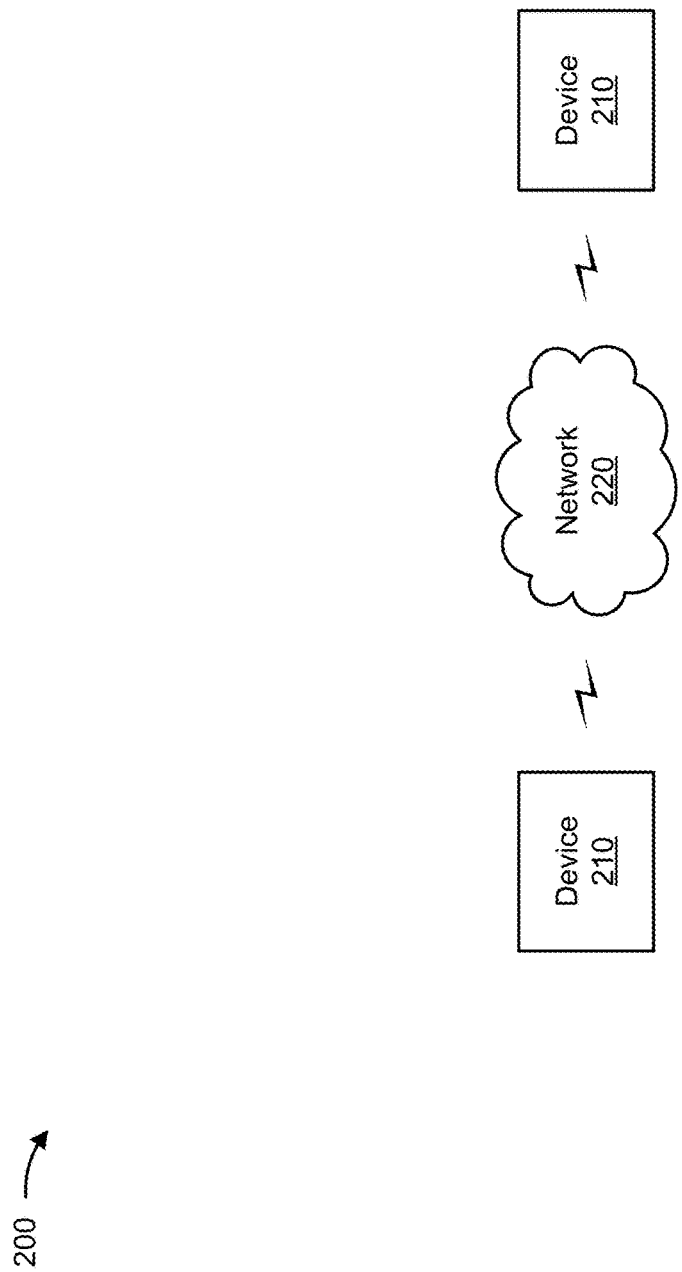
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include devices 210 (e.g., the first device, the second device, and/or the bad actor device) and a network 220. Devices and/or elements of the environment 200 may interconnect via wired connections and/or wireless connections.

The device 210 includes one or more devices capable of receiving, generating, storing, processing, and/or providing information, as described elsewhere herein. The device 210 may include a communication device and/or a computing device. For example, the device 210 may include a user device, such as a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In another example, the device 210 may include a server device, such as an application server, a client server, a web server, a database server, a host server, a proxy server, a virtual server (e.g., executing on computing hardware), or a server in a cloud computing system. In some implementations, the device 210 may include computing hardware used in a cloud computing environment.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
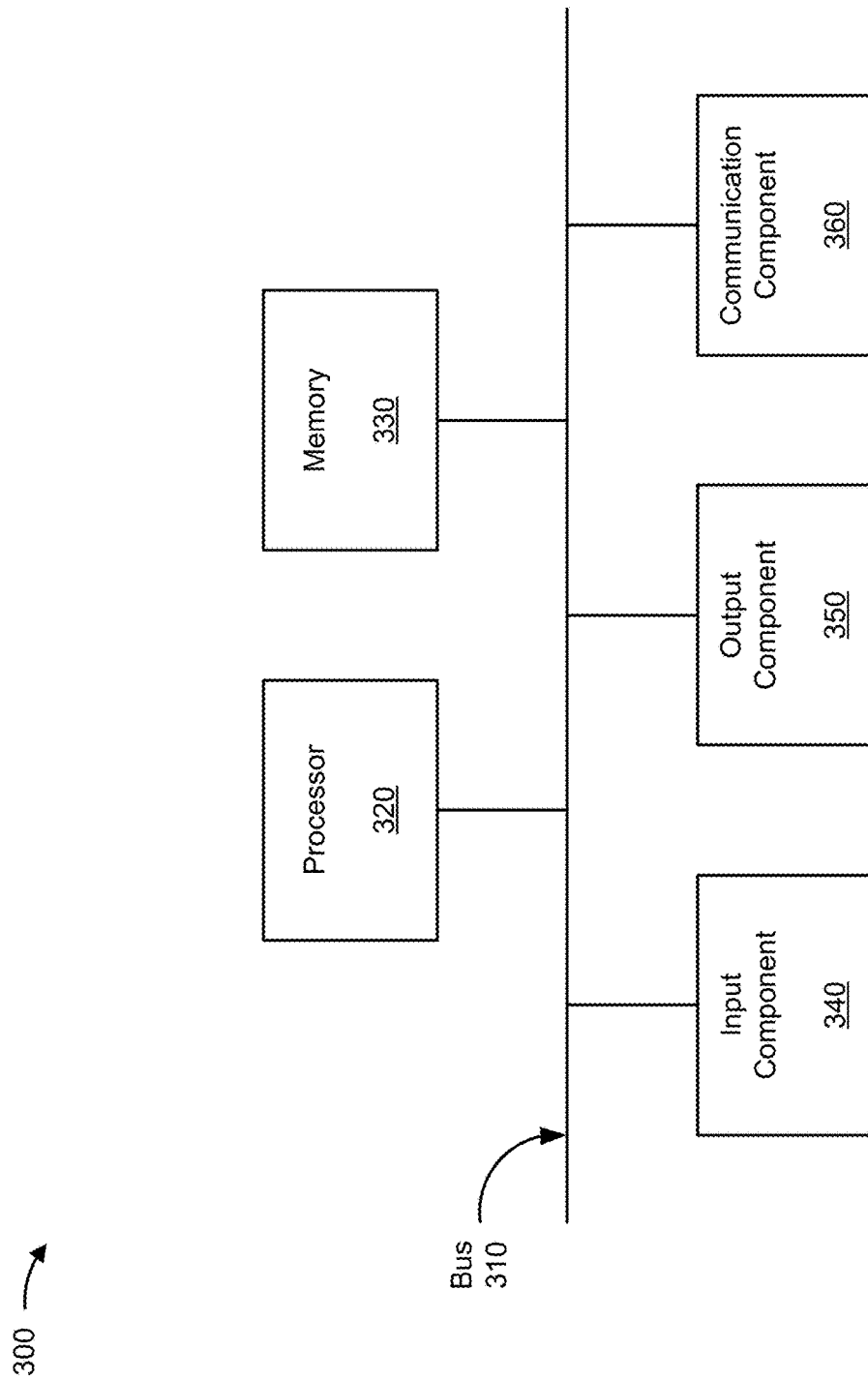
FIG. 3 is a diagram of example components of one or more devices of FIG. 2.

FIG. 3 is a diagram of example components of a device 300, which may correspond to the device 210. In some implementations, the device 210 may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, an actuator, and/or the like. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, an antenna, and/or the like.

The device 300 may perform one or more processes described herein. For example, a non-transitory computer-readable medium (e.g., the memory 330) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
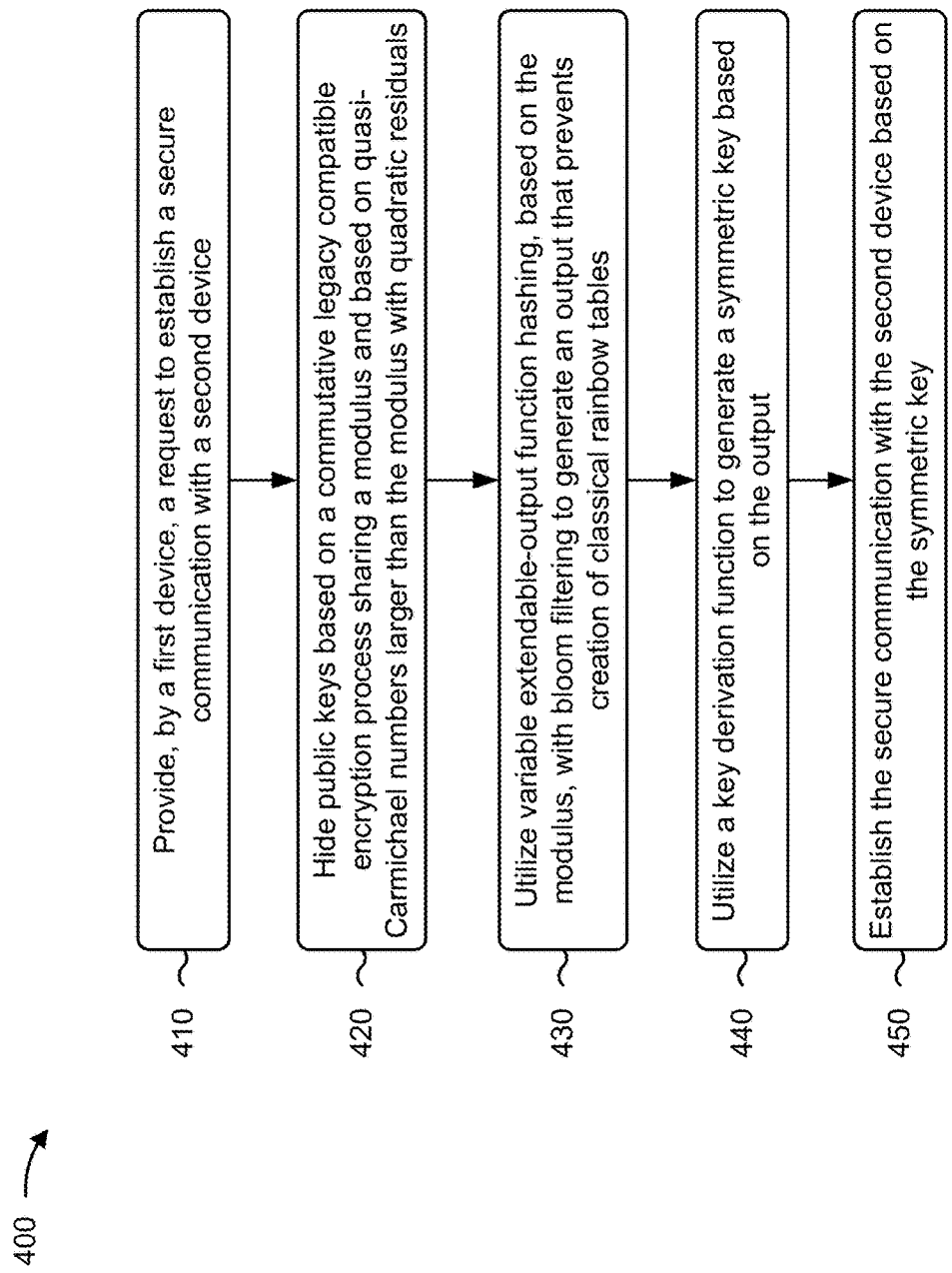
FIG. 4 is a flowchart of an example process for providing communications that are secure from quantum computer models.

FIG. 4 is a flowchart of an example process 400 for providing communications that are secure from quantum computer models. In some implementations, one or more process blocks of FIG. 4 may be performed by a device (e.g., the device 210 or the first device). In some implementations, one or more process blocks of FIG. 4 may be performed by another device or a group of devices separate from or including the device, such as another device (e.g., another device 210 or the second device). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include providing a request to establish a secure communication with a second device (block 410). For example, the first device may provide a request to establish a secure communication with a second device, as described above.

As further shown in FIG. 4, process 400 may include hiding public keys based on a commutative legacy compatible encryption process sharing a modulus and based on quasi-Carmichael numbers larger than the modulus with quadratic residuals (block 420). For example, the first device may hide public keys based on a commutative legacy compatible encryption process sharing a modulus and based on quasi-Carmichael numbers larger than the modulus with quadratic residuals, as described above. In some implementations, hiding the public keys based on the commutative legacy compatible encryption process includes selecting two prime values, multiplying the two prime values to obtain the modulus, providing the modulus to the second device, calculating a totient based on the two prime values, identifying relative primes of the totient, selecting a relative prime from the relative primes based on a greatest common divisor, encrypting a message larger than the modulus with quadratic residuals, based on the relative prime and the modulus, to generate first ciphertext, providing the first ciphertext to the second device, and doubling encrypting second ciphertext received from the second device to generate third ciphertext also generated by the second device.

In some implementations, calculating the totient based on the two prime values includes subtracting one from a first of the two prime values to obtain a first value, subtracting one from a second of the two prime values to obtain a second value, and multiplying the first value and the second value to calculate the totient. In some implementations, selecting the relative prime from the relative primes based on the greatest common divisor includes selecting the relative prime based on the greatest common divisor of the relative prime and the totient being equal to one and the relative prime being greater than one and less than the totient.

In some implementations, hiding the public keys based on the commutative legacy compatible encryption process sharing the modulus and based on the quasi-Carmichael numbers larger than the modulus with the quadratic residuals includes encrypting a message larger than the modulus based on one of the quasi-Carmichael numbers and with one of the public keys to generate first ciphertext, providing the first ciphertext to the second device, receiving second ciphertext from the second device, and encrypting the second ciphertext to generate third ciphertext also generated by the second device. In some implementations, encrypting the message larger than the modulus based on the one of the quasi-Carmichael numbers and with the one of the public keys to generate the first ciphertext includes ElGamal encrypting the message larger than the modulus based on the one of the quasi-Carmichael numbers and with the one of the public keys to generate the first ciphertext. In some implementations, encrypting the second ciphertext to generate the third ciphertext includes ElGamal encrypting the second ciphertext to generate the third ciphertext.

As further shown in FIG. 4, process 400 may include utilizing variable extendable-output function hashing, based on the modulus, with bloom filtering to generate an output that prevents creation of classical rainbow tables (block 430). For example, the first device may utilize variable extendable-output function hashing, based on the modulus, with bloom filtering to generate an output that prevents creation of classical rainbow tables, as described above. In some implementations, utilizing the variable extendable-output function hashing, based on the modulus, with the bloom filtering to generate the output includes utilizing the variable extendable-output function hashing, based on the modulus and the third ciphertext, with the bloom filtering to generate the output. In some implementations, the variable extendable-output function is a secure hash algorithm.

In some implementations, utilizing the variable extendable-output function hashing, based on the modulus, with the bloom filtering to generate the output includes multiplying a ciphertext value by eight and a value of the modulus to generate a first value, adding five hundred and twelve to the first value to generate a second value, and utilizing the variable extendable-output function hashing, based on the ciphertext value and the second value, with the bloom filtering to generate the output.

In some implementations, utilizing the variable extendable-output function hashing, based on the modulus, with the bloom filtering to generate the output includes multiplying a ciphertext value by eight and a value of the modulus to generate a first value, adding five hundred and twelve to the first value to generate a second value, utilizing the variable extendable-output function hashing, based on the ciphertext value and the second value, to generate a third value, and utilizing a last ten bits of the third value as the output.

As further shown in FIG. 4, process 400 may include utilizing a key derivation function to generate a symmetric key based on the output (block 440). For example, the first device may utilize a key derivation function to generate a symmetric key based on the output, as described above. In some implementations, the symmetric key is an advanced encryption standard 256 symmetric key. In some implementations, the second device is configured to utilize the key derivation function to generate the symmetric key based on the output.

As further shown in FIG. 4, process 400 may include establishing the secure communication with the second device based on the symmetric key (block 450). For example, the first device may establish the secure communication with the second device based on the symmetric key, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A computer-implemented method, comprising:
providing, by a first device, a request to establish a secure communication with a second device communicatively coupled with the first device via a network;
hiding, by the first device, public keys based on a commutative legacy compatible encryption process sharing a modulus and based on quasi-Carmichael numbers larger than the modulus with quadratic residuals;
utilizing, by the first device, variable extendable-output function hashing, based on the modulus, with bloom filtering to generate an output that prevents creation of classical rainbow tables;
utilizing, by the first device, a key derivation function to generate a symmetric key based on the output; and
establishing, by the first device, the secure communication over the network with the second device based on the symmetric key.

2. The computer-implemented method of claim 1, wherein hiding the public keys based on the commutative legacy compatible encryption process comprises:
selecting two prime values;
multiplying the two prime values to obtain the modulus;
providing the modulus to the second device;
calculating a totient based on the two prime values;
identifying relative primes of the totient;
selecting a relative prime from the relative primes based on a greatest common divisor;
encrypting a message larger than the modulus with quadratic residuals, based on the relative prime and the modulus, to generate first ciphertext;
providing the first ciphertext to the second device; and
double encrypting second ciphertext received from the second device to generate third ciphertext also generated by the second device.

3. The computer-implemented method of claim 2, wherein utilizing the variable extendable-output function hashing, based on the modulus, with the bloom filtering to generate the output comprises:
utilizing the variable extendable-output function hashing, based on the modulus and the third ciphertext, with the bloom filtering to generate the output.

4. The computer-implemented method of claim 2, wherein calculating the totient based on the two prime values comprises:
subtracting one from a first of the two prime values to obtain a first value;
subtracting one from a second of the two prime values to obtain a second value; and
multiplying the first value and the second value to calculate the totient.

5. The computer-implemented method of claim 2, wherein selecting the relative prime from the relative primes based on the greatest common divisor comprises:
   selecting the relative prime based on the greatest common divisor of the relative prime and the totient being equal to one and the relative prime being greater than one and less than the totient.

6. The computer-implemented method of claim 1, wherein the variable extendable-output function is a secure hash algorithm.

7. The computer-implemented method of claim 1, wherein utilizing the variable extendable-output function hashing, based on the modulus, with the bloom filtering to generate the output comprises:
   multiplying a ciphertext value by eight and a value of the modulus to generate a first value;
   adding five hundred and twelve to the first value to generate a second value; and
   utilizing the variable extendable-output function hashing, based on the ciphertext value and the second value, with the bloom filtering to generate the output.

8. A first device, comprising:
   one or more non-transitory memories;
   and one or more processors, coupled to the one or more memories, configured to:
   provide a request to establish a secure communication with a second device communicatively coupled with the first device via a network;
   hide public keys based on a commutative legacy compatible encryption process sharing a modulus and based on quasi-Carmichael numbers larger than the modulus with quadratic residuals;
   utilize variable extendable-output function hashing, based on the modulus, with bloom filtering to generate an output that prevents creation of classical rainbow tables,
      wherein the variable extendable-output function is a secure hash algorithm;
   utilize a key derivation function to generate a symmetric key based on the output; and
   establish the secure communication with the second device over the network based on the symmetric key.

9. The first device of claim 8, wherein the one or more processors, to utilize the variable extendable-output function hashing, based on the modulus, with the bloom filtering to generate the output, are configured to:
   multiply a ciphertext value by eight and a value of the modulus to generate a first value;
   add five hundred and twelve to the first value to generate a second value;
   utilize the variable extendable-output function hashing, based on the ciphertext value and the second value, to generate a third value; and
   utilize a last ten bits of the third value as the output.

10. The first device of claim 8, wherein the one or more processors, to hide the public keys based on the commutative legacy compatible encryption process sharing the modulus and based on the quasi-Carmichael numbers larger than the modulus with the quadratic residuals, are configured to:
    encrypt a message larger than the modulus based on one of the quasi-Carmichael numbers and with one of the public keys to generate first ciphertext;
    provide the first ciphertext to the second device;
    receive second ciphertext from the second device; and
    encrypt the second ciphertext to generate third ciphertext also generated by the second device.

11. The first device of claim 10, wherein the one or more processors, to encrypt the message larger than the modulus based on the one of the quasi-Carmichael numbers and with the one of the public keys to generate the first ciphertext, are configured to:
    ElGamal encrypt the message larger than the modulus based on the one of the quasi-Carmichael numbers and with the one of the public keys to generate the first ciphertext.

12. The first device of claim 10, wherein the one or more processors, to encrypt the second ciphertext to generate the third ciphertext, are configured to:
    ElGamal encrypt the second ciphertext to generate the third ciphertext.

13. The first device of claim 8, wherein the symmetric key is an advanced encryption standard 256 symmetric key.

14. The first device of claim 8, wherein the second device is configured to utilize the key derivation function to generate the symmetric key based on the output.

15. A non-transitory computer-readable medium storing a set of instructions, the set of instructions comprising:
    one or more instructions that, when executed by one or more processors of a first device, cause the first device to:
    provide a request to establish a secure communication with a second device communicatively coupled with the first device;
    hide public keys based on a commutative legacy compatible encryption process sharing a modulus and based on quasi-Carmichael numbers larger than the modulus with quadratic residuals;
    utilize variable extendable-output function hashing, based on the modulus, with bloom filtering to generate an output that prevents creation of classical rainbow tables;
    utilize a key derivation function to generate a symmetric key based on the output,
       wherein the symmetric key is an advanced encryption standard 256 symmetric key; and
    establish the secure communication over the network with the second device based on the symmetric key.

16. The non-transitory computer-readable medium of claim 15, wherein the one or more instructions, that cause the first device to hide the public keys based on the commutative legacy compatible encryption process, cause the first device to:
    select two prime values;
    multiply the two prime values to obtain the modulus;
    provide the modulus to the second device;
    calculate a totient based on the two prime values;
    identify relative primes of the totient;
    select a relative prime from the relative primes based on a greatest common divisor;
    encrypt a message larger than the modulus with quadratic residuals, based on the relative prime and the modulus, to generate first ciphertext;
    provide the first ciphertext to the second device; and
    double encrypt second ciphertext received from the second device to generate third ciphertext also generated by the second device.

17. The non-transitory computer-readable medium of claim 15, wherein the one or more instructions, that cause the first device to utilize the variable extendable-output function hashing, based on the modulus, with the bloom filtering to generate the output, cause the first device to:
    multiply a ciphertext value by eight and a value of the modulus to generate a first value;

add five hundred and twelve to the first value to generate a second value; and utilize the variable extendable-output function hashing, based on the ciphertext value and the second value, with the bloom filtering to generate the output.

18. The non-transitory computer-readable medium of claim 15, wherein the one or more instructions, that cause the first device to utilize the variable extendable-output function hashing, based on the modulus, with the bloom filtering to generate the output, cause the first device to:

multiply a ciphertext value by eight and a value of the modulus to generate a first value;

add five hundred and twelve to the first value to generate a second value;

utilize the variable extendable-output function hashing, based on the ciphertext value and the second value, to generate a third value; and utilize a last ten bits of the third value as the output.

19. The non-transitory computer-readable medium of claim 15, wherein the one or more instructions, that cause the first device to hide the public keys based on the commutative legacy compatible encryption process sharing the modulus and based on the quasi-Carmichael numbers larger than the modulus with the quadratic residuals, cause the first device to:

encrypt a message larger than the modulus based on one of the quasi-Carmichael numbers and with one of the public keys to generate first ciphertext;

provide the first ciphertext to the second device;

receive second ciphertext from the second device; and encrypt the second ciphertext to generate third ciphertext also generated by the second device.

20. The non-transitory computer-readable medium of claim 19, wherein the one or more instructions, that cause the first device to encrypt the message larger than the modulus based on the one of the quasi-Carmichael numbers and with the one of the public keys to generate the first ciphertext, cause the first device to:

ElGamal encrypt the message larger than the modulus based on the one of the quasi-Carmichael numbers and with the one of the public keys to generate the first ciphertext.

* * * * *